United States Patent [19]

Matsunawa et al.

[11] Patent Number: 5,216,498
[45] Date of Patent: Jun. 1, 1993

[54] IMAGE PROCESSING APPARATUS CAPABLE OF DETECTING MARKED REGION

[75] Inventors: Masahiko Matsunawa, Ome; Hiroshi Katoh, Hachioji, both of Japan

[73] Assignee: Konica Corporation, Tokyo, Japan

[21] Appl. No.: 864,164

[22] Filed: Apr. 3, 1992

Related U.S. Application Data

[63] Continuation of Ser. No. 495,917, Mar. 20, 1990, abandoned.

[30] Foreign Application Priority Data

| Mar. 22, 1989 | [JP] | Japan | 1-69901 |
| Mar. 22, 1989 | [JP] | Japan | 1-69902 |
| Mar. 22, 1989 | [JP] | Japan | 1-69905 |

[51] Int. Cl.⁵ .......................... G06K 9/00; H04N 1/46
[52] U.S. Cl. ........................................ 358/75; 382/17; 382/48
[58] Field of Search ............... 358/75, 80, 81, 82, 358/448, 451, 461; 382/17, 48

[56] References Cited

U.S. PATENT DOCUMENTS

| 4,841,361 | 6/1989 | Matsunawa et al. | 358/75 |
| 4,937,662 | 6/1990 | Matsunawa et al. | 358/75 |
| 4,942,461 | 7/1990 | Abe et al. | 358/75 |

FOREIGN PATENT DOCUMENTS 0300046  1/1989  European Pat. Off.
2203014A 10/1988 United Kingdom.

OTHER PUBLICATIONS

Masahiko Hase et al. "A Method for Extracting Marked Regions from Document Images," Systems & Computers in Japan, vol. 18, No. 8 (1987).

Primary Examiner—Leo H. Boudreau
Attorney, Agent, or Firm—Finnegan, Henderson, Farabow, Garrett & Dunner

[57] ABSTRACT

An image processing apparatus including an image input circuit for reading color images obtained by separating each pixel of an an original image into three color components a color data-forming circuit for forming color data for identifying a color of each of the pixels as either a white color, an achromatic color or a chromatic color on the basis of the color images, a color-reproducing circuit for converting the color images into density data corresponding to plural recording colors, and a marked region-detecting circuit for detecting a marked portion on the basis of the color data formed by the color data-forming circuit and for extracting a region enclosed by the marked portion.

21 Claims, 11 Drawing Sheets

Q: REGION SIGNAL
P: MARKER SIGNAL

↓ : SAMPLING START POINT

IMAGE PROCESSING APPARATUS CAPABLE OF DETECTING MARKED REGION

This application is a continuation of application Ser. No. 07/495,917 filed Mar. 20, 1990, now abandoned.

BACKGROUND OF THE INVENTION

This invention relates to a color image processing apparatus that is suited to color conversion processing. There are various image processing apparatuses that resolve a color character or picture image into red R and cyan C, read them optically, and record the image on a recording paper with an output unit, such as a photoelectric copying machine, according to the read data.

Some of the foregoing image processing apparatuses perform a color conversion function, i.e., processing for converting the part of black characters of a monochromatic document, which is enclosed by a marker, to the color which is the same as a predetermined color.

When the foregoing image processing apparatus performs color conversion, color conversion other than a monochromatic marker, such as red or blue, cannot be performed because reading and recording are performed in red and cyan or red, blue, and black. Therefore the part enclosed by a marker other than red or blue cannot be correctly converted.

There is a color image processing apparatus which resolves a color character or picture image into red R, green G, and blue B, reads them optically, converts them to recording colors yellow Y, magenta M, cyan C, and black B, and records the image on a recording paper with an output unit, such as a photoelectric color copying machine, according to the converted data. The foregoing color image processing apparatus can read and record a color document. However, no consideration is given the full color conversion function of the foregoing apparatus, that is, no consideration is given to the reading of various marker colors or to correcting conversion of black characters to the marker color.

SUMMARY OF THE INVENTION

The present invention seeks to remedy the foregoing problems. An object of the present invention is to provide an image processing apparatus which can perform full color conversion.

An image processing apparatus of the present invention is characterized in that the image processing apparatus comprises an image reading means or image input means for resolving or splitting a document image into three colors and reading the color resolved image, a color code generating means or a color data-forming means for generating color code or color data indicating white color, achromatic color, or chromatic color which each pixel of the color resolved image read by the image reading means belongs to, a color reproducing means for converting the color resolved image read by the image reading means to density data corresponding to the recording colors, a marked region detecting means for detecting the marker of the document image according to the color codes from the color code generating means and extracting the region enclosed by the marker, a sampling means for sampling the density data of the marker, and a color converting means for converting the density data in the region enclosed by the marker to the density data sampled by the sampling means, and the sampling means samples the density data at the peak level of the density data of one color of the color reproduced density data.

In the image processing apparatus of the present invention, the marked region detecting means detects the region according to the scanning lines for image reading. In the detected marked region, the sampling means samples the marker density data at the density peak level of the marker signals, and the color converting means performs color conversion of the image data according to the sampled density data.

The image processing apparatus of the present invention is also characterized in that the image processing apparatus comprises a color code generating means for generating color codes which discriminate the color resolved image of a document image in the achromatic color part and chromatic color part for each pixel, a color reproducing means for converting the color resolved image of the document image to recording color density data corresponding to the recording colors, a marked region detecting means for detecting the marked region of the document image according to the color codes from the color code generating means, a marker color converting means for sampling the recording color density data in the marked region and converting the density data in the region enclosed by the marker to recording color density data corresponding to the color of the marker, and a converting means for converting one density data of the color resolved image of the document image to recording color density data, and the recording color density data reproduced by the color reproducing means and the density data converted by the converting means are sampled by the marker color reproducing means on the same path.

In the image processing apparatus of the present invention, since the recording color density data which is reproduced in color and the density data which is converted by the converting means are supplied and sampled by the marker color reproducing means on the same path, color conversion can be performed by a simple configuration.

An image processing apparatus of another embodiment of the present invention is characterized in that the image processing apparatus comprises an image reading means for resolving a document image in three colors and reading the color resolved image, a color code generating means for generating a color code indicating white color, achromatic color, or chromatic color which each pixel of the color resolved image read by the image reading means belongs to, a color reproducing means for converting the color resolved image read by the image reading means to density data corresponding to the recording colors, a marked region detecting means for detecting the marker of the document image according to the color codes from the color code generating means and extracting the region enclosed by the marker, a sampling means for sampling the color of the marked region detected by the marked region detecting means from the density data, and a color converting means for converting the density data in the region enclosed by the marker to density data corresponding to the marker color, and the sampling means simultaneously samples the density data of each recording color in the marked region.

In the image processing apparatus of the present invention, the marker colors are sampled by the sampling means in the marked region simultaneously for each recording color.

DETAILED DESCRIPTION OF THE INVENTION

Embodiments of the present invention will be described in detail hereunder with reference to the accompanying drawings.

Figure 1:
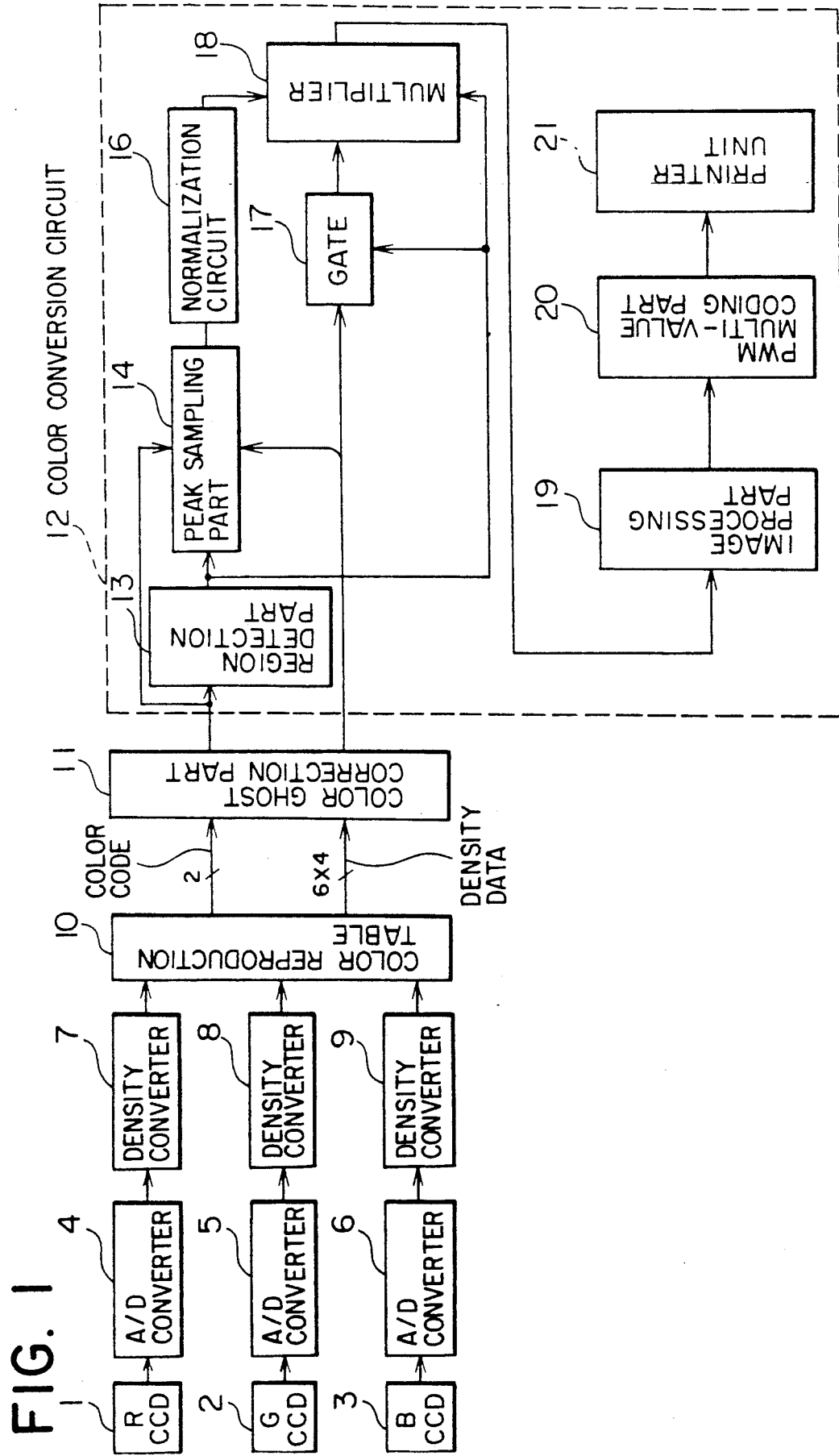
FIG. 1 is a schematic view of the first embodiment of the present invention.

Firstly, the image processing apparatus of the present invention will be outlined with reference to the block diagram shown in FIG. 1. In the case of FIG. 1, numeral 1 designates R-CCD for converting a red document image to an image signal, 2 designates a G-CCD for converting a green document image to an image signal, 3 designates a B-CCD for converting a blue document image to an image signal, 4 designates an A/D converter for converting the red image signal which is read by R-CCD 1 to 8-bit digital data, 5 designates an A/D converter for converting the green image signal which is read by G-CCD 2 to 8-bit digital data, and 6 designates an A/D converter for converting the blue image signal which is read by B-CCD 3 to 8-bit digital data. Numeral 7 designates a density converter for converting the red 8-bit digital data to 6-bit digital data, 8 designates a density converter for converting the green 8-bit digital data to 6-bit digital data, and 9 designates a density converter for converting the blue 8-bit digital data to 6-bit digital data. Numeral 10 designates a color reproduction table for performing color code (a 2-bit code indicating which of white, black, or a chromatic color, each pixel belongs to, for example, white: 00, black: 11, chromatic color: 10) processing or color reproduction (R, G, B - Y, M, C, K). The color reproduction table 10 outputs 2-bit color codes and a 6-bit density signal for each of Y, M, C, and K. Numeral 11 designates a color ghost correction part for performing color ghost corrections, and 12 a color conversion circuit for detecting the marked region of a document and converting the region to the marker color. Numeral 13 designates a region detection part for detecting a color marker and extracting the region enclosed by the marker, 14 designates a sampling part for sampling density data of the color marker, 16 designates a normalization circuit for obtaining a normalization factor by normalizing the sampled density data, and 17 designates a gate for selectively passing the density data of black K according to the recording color of the color marked region and of a printer unit 21 which is described later. When the printer unit 21 stores black K, the gate 17 passes the input black K data as it is, and when the printer unit 21 stores Y, M, and C, the gate 17 passes only the black data in the marked region. Numeral 18 designates a multiplication circuit for converting the black data passing through the gate 17 to the marker color data by multiplying the black data by the normalization factor. The multiplier 18 performs multiplication only in the marked region and passes black data in another region. Numeral 19 designates an image processing part for performing various image processing such as filtering of density signals, variable magnification, or halftoning, 20 designates a PWM multi-value coding part for multi-leveling a 6-bit density signal by pulse width modulation (PWM), and 21 designates a printer unit for forming a color image by superposing a toner image of each of Y, M, C, and K sequentially on a photosensitive drum.

The operation will be described hereunder with reference to FIG. 1. Firstly, a document image is read by an image scanning part. The image data (optical image) of the document is separated into a red R color resolved image, a green G color resolved image, and a blue B color resolved image by a dichroic mirror (not shown in the figure). These color resolved images are supplied to R-CCD 1, G-CCD 2, and B-CCD 3, and converted to R, G, and B analog signals respectively. The analog signals are converted to digital data with a length of a predetermined number of bits, 8 bits in this example, by the A/D converters 4, 5, and 6 respectively for each pixel. When this A/D conversion is performed, a shading correction is simultaneously performed according to the imaging data on a reference white plate.

The shading-corrected 8-bit data of R, G, and B is supplied to the density converters 7, 8, and 9, respectively. The density converters correct the color balance and r (gamma), and simultaneously convert 8-bit data to 6-bit data for each color.

The output data of the R, G, and B density converters 7, 8, and 9 is supplied to the color reproduction table 10. The color reproduction table 10 generates a color code (2-bit data, for example, white: 00, black: 11, chromatic color: 10) indicating the color region of white, black, or chromatic color which each pixel belongs to according to the individual data levels of R, G, and B. The color code generation process is as follows:

(1) Generation of a white code:

Firstly, R, G, and B are converted to the XYZ coordinate system by the expression indicated below.

$$\begin{bmatrix} X \\ Y \\ Z \end{bmatrix} = \begin{bmatrix} 0.6580 & 0.0838 & 0.1812 \\ 0.3279 & 0.6158 & -0.0027 \\ -0.0087 & -0.3369 & 1.4888 \end{bmatrix} \cdot \begin{bmatrix} R \\ G \\ B \end{bmatrix}$$

This XYZ coordinate system is converted to the L*a*b* uniform color space by the expression indicated below.

$L^* = 116(Y/Y_o)^{\frac{1}{3}} - 16$ $a^* = 500[(X/X_o)^{\frac{1}{3}} - (Y/Y_o)^{\frac{1}{3}}]$ $b^* = 200[(Y/Y_o)^{\frac{1}{3}} - (Z/Z_o)^{\frac{1}{3}}]$ where
$Y_o = 100$ Xo=98.07
Zo=118.23

In the uniform color space L*a*b* which is obtained by the above conversion, the white region is regarded as L*≧90.

(2) Generation of an achromatic color (black) code:
The value of Q is obtained from the expression indicated below from the R, G, and B signals.

$$Q = \sqrt{[(R - Wo)^2 + (G - Wo)^2 + (B - Wo)^2]/(W \cdot Wo)}$$

The Q parameter is obtained in this way, and the black region is regarded as Q≦15.

(3) Generation of a chromatic color code:
A chromatic color code is set by regarding a region other than the white region and the black region as a chromatic color region. The color reproduction table 10 performs conversion of R, G, and B to Y, M, C, and K by a LUT (a lookup table comprising ROM), and generates 6-bit density data of each of Y, M, C, and K.

Then, the color ghost correction part 11 detects and eliminates color ghosts, because unnecessary color ghosts are generated especially around black characters during color separation. The color ghost correction part 11 detects whether a color ghost is generated, and converts the color code of a pixel, a color ghost of which is detected, to the code of the correct color. This color ghost correction is performed in the main scanning direction and in the sub-scanning direction.

Figure 2:
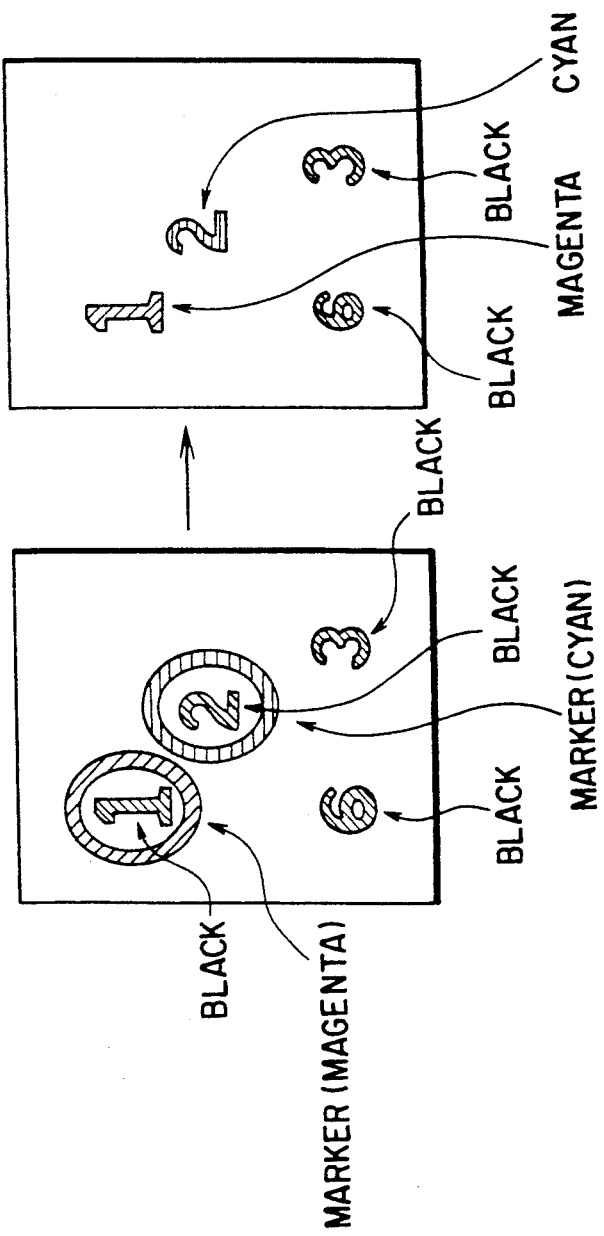
FIG. 2a and 2b are illustrations of the state of color conversion.

The color conversion circuit 12 performs color conversion. The color conversion processing converts the parts of black characters of a document which are enclosed by the marker to the color of the marker. The color conversion circuit 12 detects the region enclosed by the marker, and normalizes and outputs the black character density data in this region according to the Y, M, and C densities of the marker corresponding to the Y, M, and C images formed by the printer unit 21. FIGS. 2a and 2b are illustrations indicating the state of color conversion. FIG. 2a shows a document before color conversion, and FIG. 2b shows the output result recorded by color conversion. As shown in the figures, the parts of the black characters enclosed by the color markers are changed to the colors of the individual markers. The color conversion will be described later in detail.

The image processing part 19 performs various image processing such as filtering (MTF correction, smoothing), variable magnification, and halftoning.

Then, the PWM multi-value coding part 20 performs multi-leveling by pulse width modulation (PWM) so as to make data suited to printing, and the printer unit 21 forms an image. Y, M, C, and K toner images are sequentially superimposed on the photosensitive drum and transferred to a transfer paper.

Figure 3:
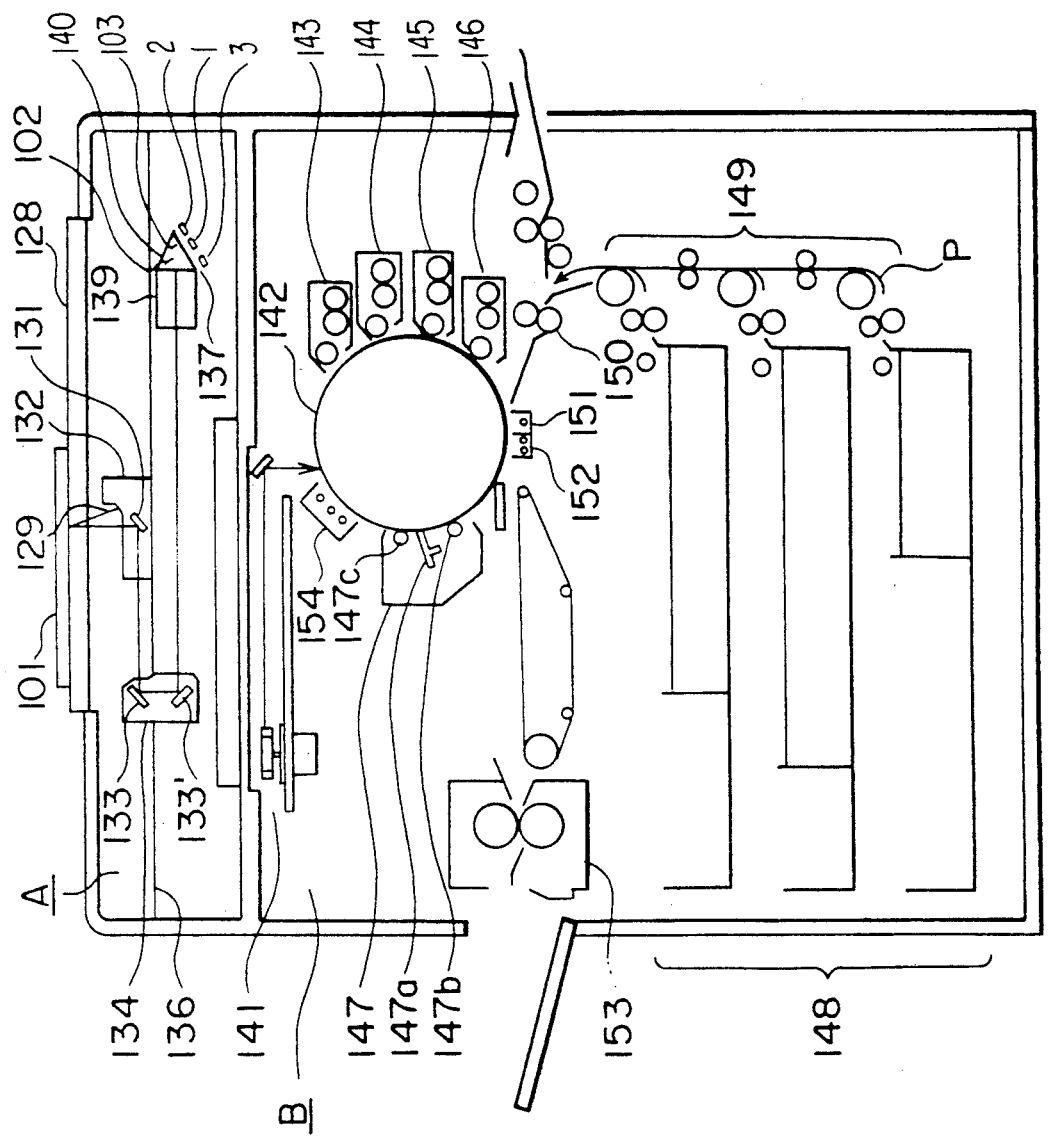
FIG. 3 is a schematic view of a copying machine.

Next, the overall configuration and operation of a copying machine which uses an image processing apparatus of the present invention will be described hereunder with reference to FIG. 3.

In this description, a color dry developing method is assumed to be used for development of the copying machine. In this example, a 2-component non-contact and reverse development method is used, that is, a transfer drum used for conventional color image formation is not used but images are superimposed on a photoelectric photosensitive drum which forms images. To miniaturize the equipment in the example indicated below, yellow Y, magenta M, cyan C, and black K images are developed on an image forming OPC photosensitive drum by 4 revolutions of the drum, transferred once after development, and then transferred to a transfer paper such as a general paper.

When a copy button (not shown in the figure) of the operation unit of the copying machine is turned on, a document reading unit A is driven, and a document 101 on a document plate 128 is scanned by light from an optical system.

The optical system comprises a carriage 132 having a light source such as a halogen lamp and a reflection mirror 131 installed thereon, and a movable mirror unit 134 having V mirrors 133 and 133' installed thereon.

The carriage 132 and the movable mirror unit 134 move on a slide rail 136 by a stepping motor 135 at individual predetermined speeds and in individual predetermined directions.

Optical data (image data), obtained by irradiating the document 101 with the light source 129, is sent to an optical data conversion unit 137 via the reflection mirror 131 and the mirrors 133 and 133'.

A reference white plate 138 is installed on the back of the left end of a platen glass 128 so as to normalize an image signal to a white signal by scanning the reference white plate 138 by light.

The optical data conversion unit 137 comprises a lens 139, a prism 140, two dichroic mirrors 102 and 103, CCD 1 where a red color resolved image is formed, CCD 2 where a green color resolved image is formed, and CCD 3 where a blue color resolved image is formed.

An optical signal obtained by the optical system is focused by the lens 139, and color-resolved into blue optical data and yellow optical data by the dichroic mirror 102 installed within the prism 140. Furthermore, the yellow optical data is color-resolved into red optical data and green optical data by the dichroic mirror 103.

By doing this, a color optical image is resolved into red R, green G, and blue B optical data by the prism 140. Each color resolved image is formed on the light receiving surface of each CCD, and an image signal which is converted to an electrical signal is obtained. The image signal is signal-processed by a signal processing system, and then a recording image signal of each color is outputted to a writing unit B.

The signal processing system comprises, as described later, A/D converters and various signal processing circuits such as a color reproduction table, a color ghost correction part, a color conversion circuit, and a PWM multi-value coding part.

The writing unit B (a printer unit 20) comprises a deflector 141. A galvanomirror, a rotational polygon mirror, or a deflector comprising a light polarizer using a crystal may be used as a deflector 141. A laser beam which is modulated by a color signal is deflection-scanned by this deflector 141.

When the deflection scanning starts, the beam scanning is detected by a laser beam index sensor (not shown in the figure), and a beam modulation is started by the first color signal (for example, a yellow signal). The modulated beam scans on an image forming unit (a photosensitive drum) 142 which is uniformly charged with static electricity by a charger 154.

An electrostatic latent image corresponding to the first color signal is formed on the image forming unit 142 by the main scanning by the laser beam and by the sub-scanning by rotation of the image forming unit 142. This electrostatic latent image is developed by a developing machine 143 containing a yellow toner so as to form a yellow toner image. This developing machine is applied with a predetermined development bias voltage from a high voltage source.

A toner is supplied to the developing machine when necessary by controlling a toner supply means (not shown in the figure) according to a command signal from a CPU (not shown in the figure) for system control. The foregoing yellow toner image is rotated when the pressing of a cleaning blade 147a is released, and an electrostatic latent image is formed according to the second color signal (for example, a magenta signal) in the same way as with the first color signal. The electrostatic latent image is developed by a developing machine 144 containing a magenta toner so as to form a magenta toner image. Needless to say, the developing machine 144 is applied with a predetermined development bias voltage from the high voltage source.

In the same way, an electrostatic latent image is formed according to the third color signal (for example, a cyan signal), and a cyan toner image is formed by a developing machine 145 containing a cyan toner. An electrostatic latent image is formed according to the fourth color signal (a black signal), and a black toner image is formed by a developing machine 146 containing a black toner.

Therefore, multi-color toner images are superimposed on the image forming unit 142.

The forming of four-color toner images is described in this example. Needless to say, however, a two-color or monochromatic toner image can be formed. In the foregoing development processing, an example of a so-called non-contact 2-component jumping phenomenon is shown, wherein each toner is sent to the image forming unit 142 when the individual developing machines are applied with AC and DC bias voltages from the high voltage source.

A predetermined amount of each toner is supplied to the developing machines 143, 144, 145, and 146 according to each command signal from the CPU as described above. A recording paper P which is fed from a paper feeder 148 via delivery rollers 149 and timing rollers 150 is conveyed onto the surface of the image forming unit 142 in synchronization with the rotation of the image forming unit 142. The multi-color toner image is transferred onto the recording paper P by a transfer pole 151 which is applied with a high voltage from the high voltage source, and the recording paper P is separated by a separation pole 152.

The separated recording paper P is conveyed to a fixing machine 153, and fixed by the fixing machine to obtain a color image.

After image transfer, the image forming unit 142 is cleaned by a cleaner 147 and waits for the next image forming process.

In the cleaner 147, a predetermined DC voltage is applied to a metallic roller 147b so as to easily collect the toner removed by a cleaning blade 147a. The metallic roller 147b is installed in a non-contact state with the surface of the image forming unit 142. After cleaning, the cleaning blade 147a is released from the pressing state. To remove an unnecessary toner which remains after release of the cleaning blade 147a, an auxiliary roller 147c is provided. By rotating the auxiliary roller 147c in the direction opposite to the rotational direction of the image forming unit 142 in contact therewith, unnecessary toner can be fully removed.

Next, the color conversion, which is one of the important processes, of the present invention will be described in detail.

Firstly, the detection of the marked region will be described. The detection of the marked region is performed according to a marker signal. A chromatic color code generated by the foregoing color reproduction table 10 is used as a marker signal.

Figure 4:
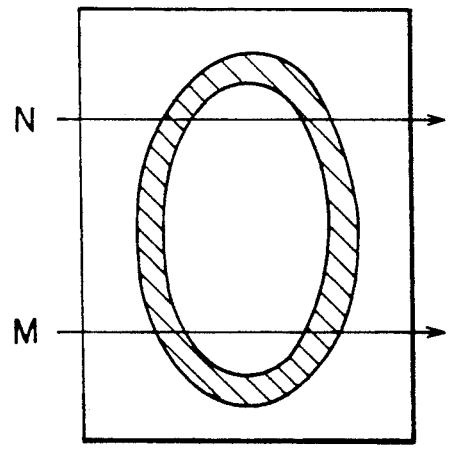
FIG. 4 is an illustration of the scanning state of scanning lines for color conversion.
Figure 5:
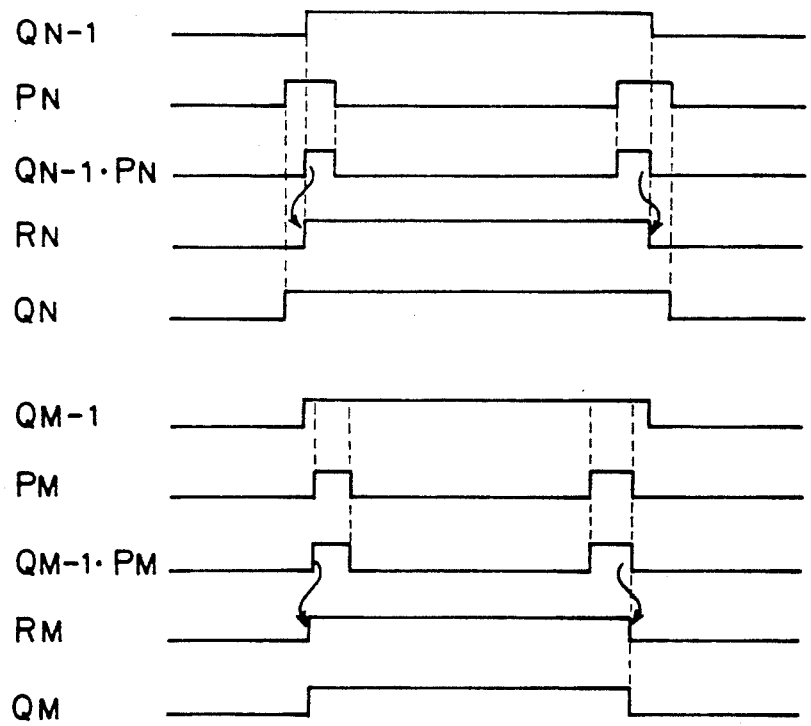
FIG. 5 is a waveform diagram indicating the generating state of marked region signals.

FIG. 5 shows the state of region detection by the region detection part 13 using a document with a chromatic marker drawn on a white base which is shown in FIG. 4. A marker signal which is obtained when the marker is scanned as shown by a symbol N in FIG. 4 becomes a signal $P_N$ in FIG. 5. A region signal which is obtained for the previous scanning N−1 (not shown in FIG. 4) is assumed to be a signal $Q_{N-1}$ in FIG. 5. An AND signal $Q_{N-1} \times P_N$ of the two signals is obtained, and an edge detection pulse $R_N$ from the leading edge to the trailing edge of $Q_{N-1} \times P_N$ is generated. Then, an OR signal $Q_N$ of the marker signal $P_N$ and the edge detection pulse $R_N$ is generated. This signal $Q_N$ is regarded as a region signal for the current scanning line N.

In the same way, a marker signal which is obtained when the marker is scanned as shown by a symbol M shown in FIG. 4 becomes a signal $P_M$ in FIG. 5. A region signal which is obtained for the previous scanning M−1 (not shown in FIG. 4) is assumed to be a signal $Q_{M-1}$ in FIG. 5. An AND signal $Q_{M-1} \times P_M$ of the two signals is obtained, and an edge detection pulse $R_M$ from the leading edge to the trailing edge of $Q_{M-1} \times P_M$ is generated. Then, an OR signal $Q_M$ of the marker signal $P_M$ and the edge detection pulse $R_M$ is generated. This signal $Q_M$ is regarded as a region signal for the current scanning line M.

Although the marked region is detected in this way, it is required to sample the color data of this marker. In the present invention, the Y, M, C, and K density data of the marker is sampled at the peak level of the marker signal for color data stability. Since this color data sampling is performed at the location of the peak level of the marker signal, the marker line width is not limited.

The marker color at the peak level is stable. Therefore, the present invention does not mistakenly sample a color ghost, in which the edge of a black character is not fully corrected, as a region signal.

Figure 6:
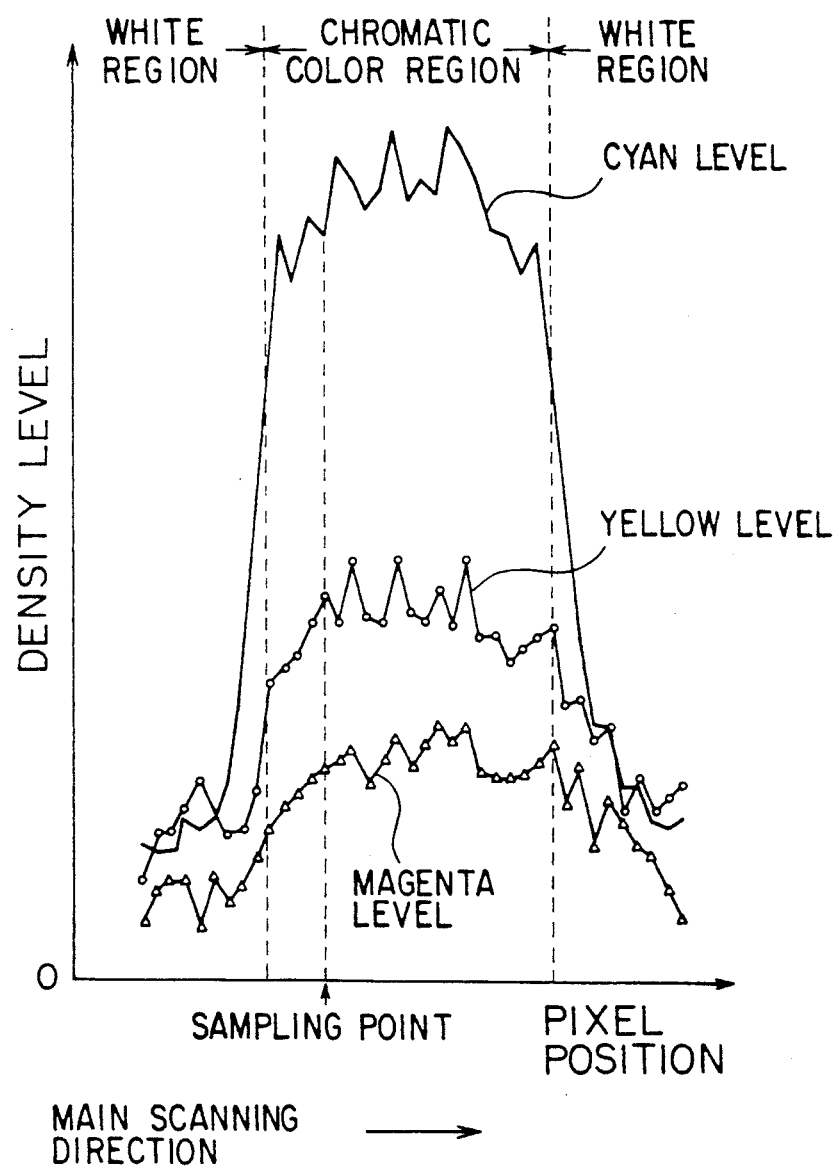
FIG. 6 is an illustration of the relationship between marked region and sampling point.

FIG. 6 is a characteristic diagram indicating the density levels of Y, M, and C for a scanning line. A case wherein the peak sampling part 14 detects the yellow level peak value and the peak value is sampled will be described hereunder. For example, the peak sampling part 14 samples yellow density data for several pixels in the chromatic region, and the sampling point is the location just prior to the pixel having the first decreasing level. At this sample point, the densities of Y, M, and C are sampled. The sampling point may be the location at the peak level of another color.

Next, the marker color density data which is obtained in this way is normalized. The normalization circuit 16 determines the content ratio of the densities of Y, M, C, and K to the maximum densities of Y, M, C, and K respectively as a normalization factor.

The normalization factor (Y', M', C', K') can be obtained from the expression indicated below.

$$(Y', M', C', K') = \frac{(Y, M, C, K)}{(Y, M, C, K)}$$

By multiplying the black density data in the marked region which passes through the gate 17 by the normalization factor which is obtained in this way with the multiplication circuit 18, image data which is subject to color conversion is obtained. When Y is recorded, the K density data in the marked region passes through the gate 17. This K density data is multiplied by the normalization factor Y' by the multiplication circuit 18, and an image signal of the Y component of the marker color is obtained. For M and C, image signals with the normalization factor multiplied are obtained in the same way. When K is recorded, the K density data outside the marked region passes straight through the gate 17 and the multiplier 18. The K data in the marked region is multiplied by the normalization factor K' by the multiplier 18, and an image signal of the K component of the marker color is obtained. The printer unit 21 superimposes toner images corresponding to the image signals on the image forming unit 14 in the order of Y, M, C, and K, and then transfers the superimposed image to a transfer paper. The color conversion is performed within the marked region and another region is copied straight to form an image.

In the present invention, as mentioned above, the color conversion is performed by detecting the marked region for each scanning line in the main scanning direction, sampling the Y, M, C, and K components of the marker color at the peak level of the marker signal, and multiplying the K density data (black characters) in the marked region by the normalization factor of each color component to convert the data to image data of each color component. By doing this, the full color conversion can be performed correctly and easily.

Figure 7:
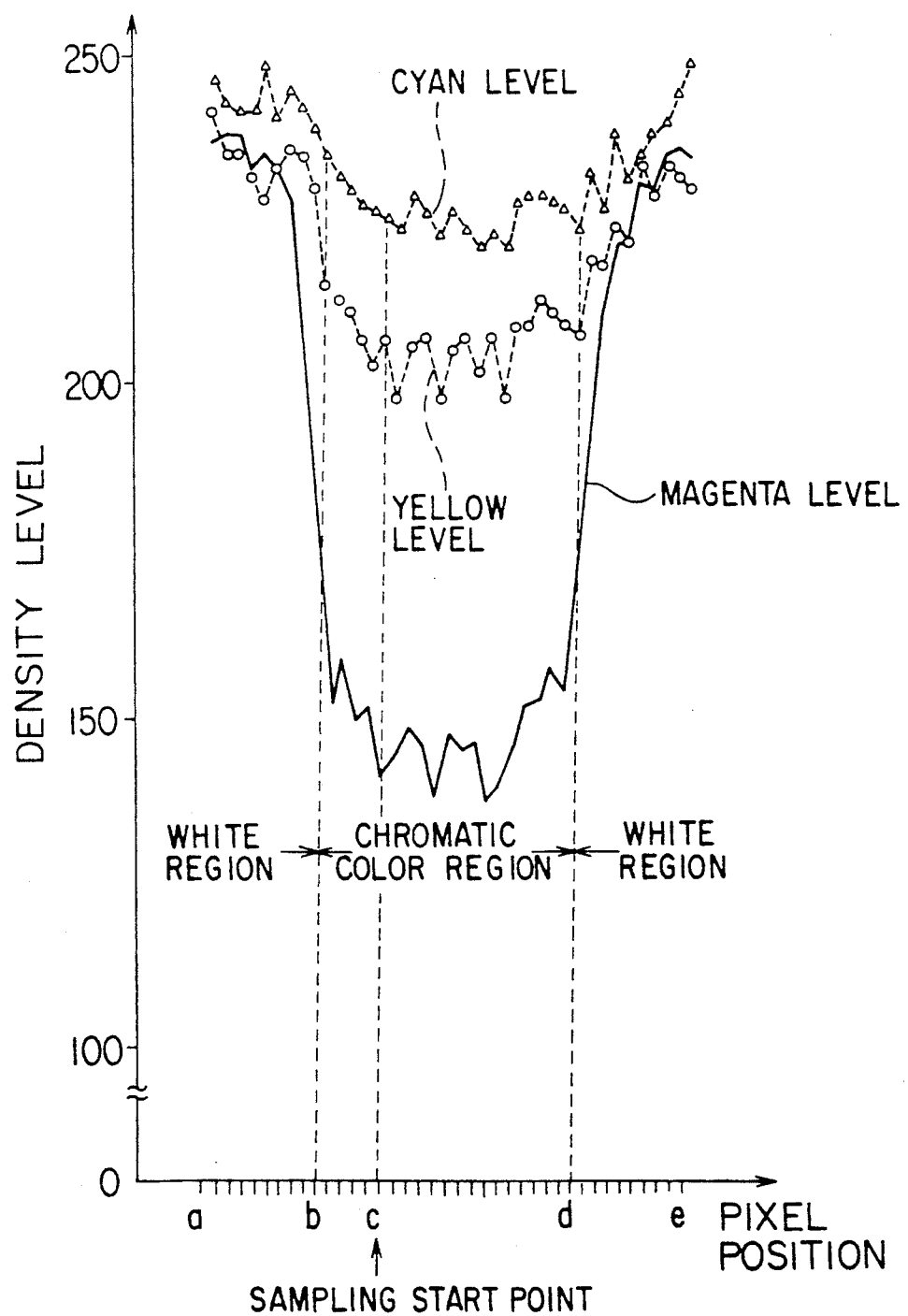
FIG. 7 is an illustration of the density characteristics of a blue fluorescent marker.
Figure 8:
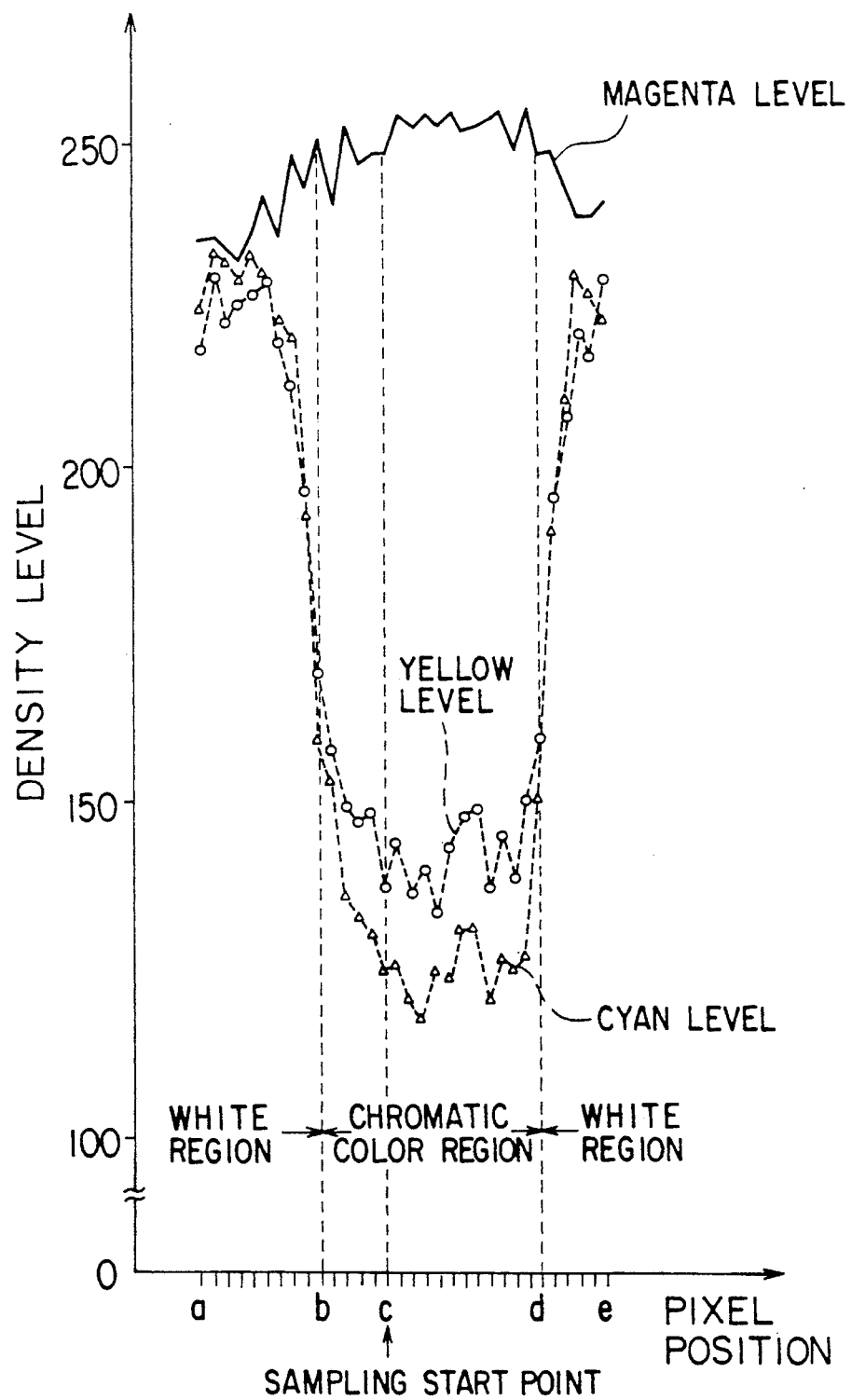
FIG. 8 is an illustration of the density characteristics of an orange fluorescent marker.

Next, another desirable embodiment on sampling of the marker color data will be described hereunder. FIG. 7 is an illustration of measured R, G, and B densities near the blue fluorescent marker parts (b, c, and d shown in FIG. 7) on a white base document. FIG. 8 is an illustration of measured R, G, and B densities near the orange fluorescent marker parts (b, c, and d shown in FIG. 8) on a white base document. The figures show that the ends of the chromatic region b, c, and d (marker parts) are not suited to sampling because the marker color is thin. The color density in the region starting at a location 4 or 5 pixels away from each end is almost equal to the density at the center. Although the R, G, and B densities are used for description in FIGS. 7 and 8, the density characteristics of Y, M, C, and K are almost the same.

For color data stability in the present invention, the marker Y, M, C, and K density data is simultaneously sampled for four pixels continuously starting at the fourth or fifth (fixed) pixel from the leading edge of the marker signal. Since the color data sampling is performed within the width of the marker line, it is desirable to set the marker line width to 2 mm or more. It is desirable to regard a signal of a serial data string of 8 to 9 pixels (=4 to 5 pixels plus 4 pixels) or more as a marker signal.

Figure 9:
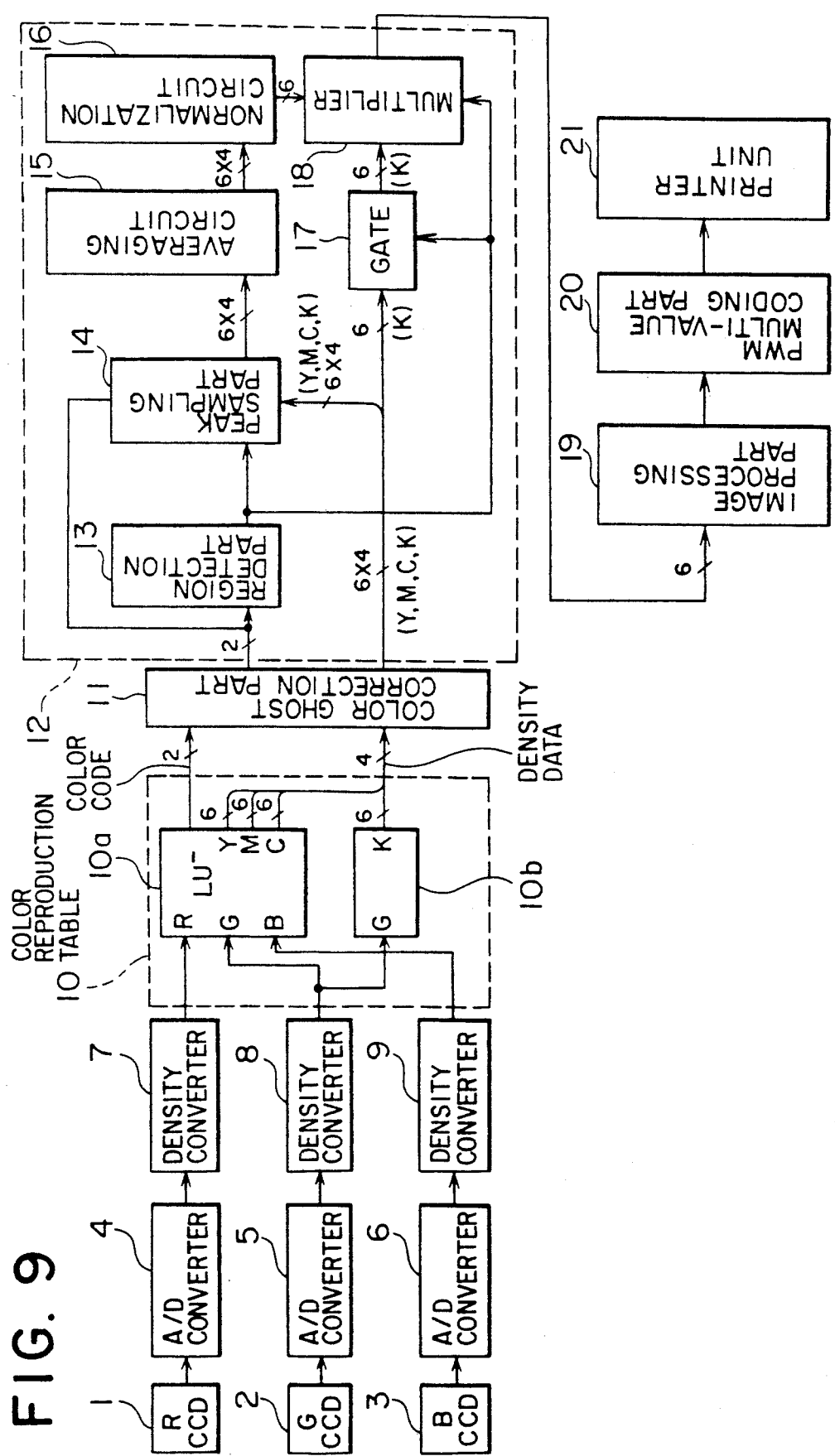
FIG. 9 is a schematic view of the second embodiment of the present invention.

FIG. 9 is a block diagram of an image processing apparatus which the foregoing color data sampling method is applied to. A configuration element shown in FIG. 9, which has a number shown in FIG. 1, has the same function as that of the element shown in FIG. 1. The color reproduction table 10 in this embodiment comprises a lookup table (LUT) 10a which generates color codes and Y, M, and C density data and a shadow color conversion part 10b which converts G density data to K density data.

Figure 10:
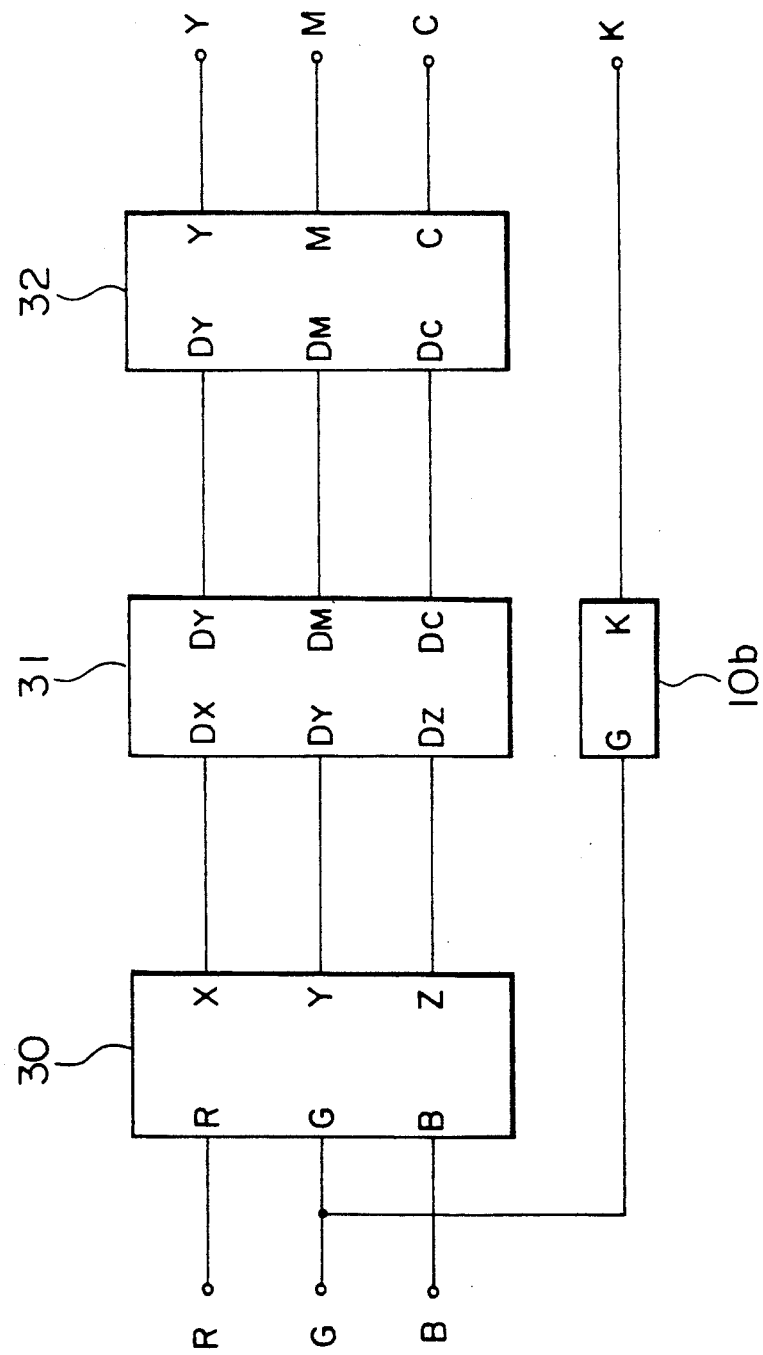
FIG. 10 is a schematic view of main units of a color reproduction table.

FIG. 10 is a schematic view of concrete main units of the color reproduction table 10. This figure shows conversion from R, G, and B to Y, M, C, and K. In the case of FIG. 10, numeral 30 designates a scanner characteristic correction circuit for correcting the characteristics of the image scanning part (scanner) and converts R, G, and B to X, Y, and Z, and 31 a linear masking part for converting the X, Y, and Z densities to the Y, M, and C densities $D_Y$, $D_M$, and $D_C$. Numeral 32 designates a toner superimposition process correction part for determining necessary density data which is converted to a toner amount according to the toner amount to be adhered to the image forming unit 142 in consideration of the adhesion of toners for toner superimposition on the image forming unit 142. Numeral 10b designates, as previously mentioned, a shadow color conversion part for converting green G density data to black K density data.

The black K (or achromatic color) density data on a document possibly contains fixed rates of red R, green G, and blue B respectively, and the green G density data may be converted for substitution. In the present invention, the green G density data is converted to black K density data by the shadow color conversion part 10b. Therefore, there is no need for UCR, and the circuit configuration is extremely simplified. The K density data which is obtained in this way is handled on the same path as the density data of the other three colors (Y, M, C). These four color data of Y, M, C, and K are supplied to the sampling part 14 and sampled simultaneously. Therefore, the signal processing is simplified.

Figure 11:
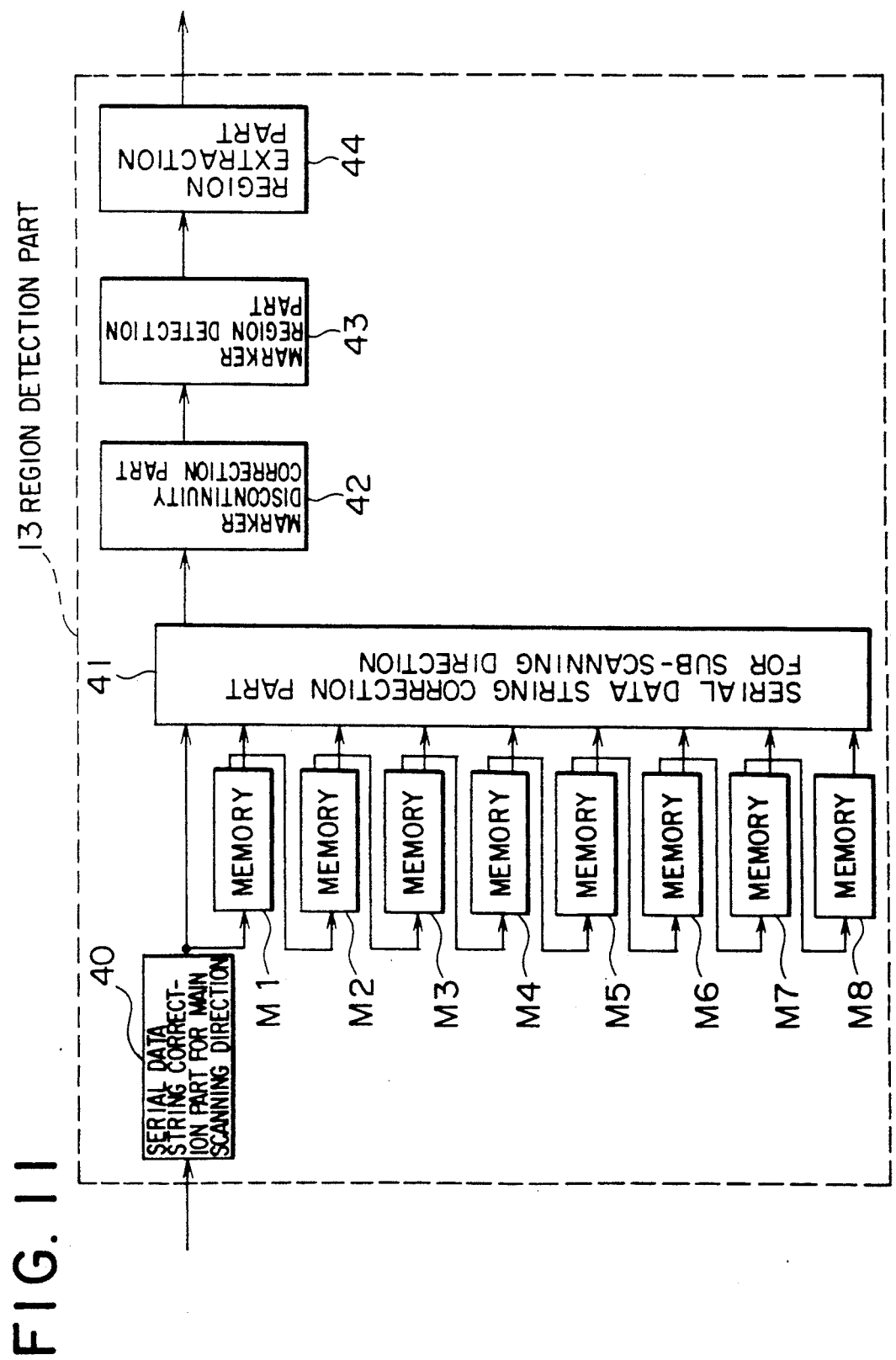
FIG. 11 is a schematic view of main units of a region detection part.

FIG. 11 is a schematic view of the region detection part 13. In the case of FIG. 11, numeral 40 designates a serial data string correction part for main scanning direction for correcting the serial data string in the main scanning direction, M1 to M8 memories for delaying each correction by a scanning line, and 41 a serial data string correction part for sub-scanning direction for correcting the serial data string in the sub-scanning direction when it receives output signals from the serial data string correction part for main scanning direction 40 and the memories M1 to M8. Color codes (of pixels lined in the sub-scanning direction) which are delayed by the time corresponding to a scanning line each by M1 to M8 are applied to the serial data string correction part for sub-scanning direction 41. "Serial data string" means the length of continued codes which have the same value. Numeral 42 designates a marker discontinuity correction part for correcting a discontinuous or faint marker, 43 a marked region detection part for detecting the marked region on a document by a color code, and 44 a region extraction part for extracting the region enclosed by the marker.

Assuming that color codes (chromatic color; chromatic color, achromatic color, or black; black, white; white) applied to the region detection part 13 are in the following order in the main scanning or sub-scanning direction:

white chromatic chromatic chromatic chromatic black black black black the serial data string correction part for main scanning direction 40 or the serial data string correction part for sub-scanning direction 41 corrects and converts a chromatic color code to a black color code like "white chromatic chromatic chromatic black black black black black". Since a chromatic color neighboring black exists, it is discriminated that a color ghost remains at the edge of the black character. When a chromatic color enclosed by white exists, the serial data string correction is not performed because a marked region is considered to exist on the white base. Then, the marker discontinuity correction part 42 corrects the discontinuity of the marker, and the marked region detection part 43 detects the marked region on the document. The marked region detection part 43 detects a marked region with a serial data string exceeding a predetermined string length. It is desirable, for example, that when chromatic colors of a string length of 8 or 9 or more exist, the marked region detection part 43 is set so as to discriminate them as a marked region. The region extraction part 44 extracts the marked region which is detected in this way.

In the case of FIG. 9, numeral 15 designates an averaging circuit for averaging the density data of the sampled color marked region, and then in this embodiment, the normalization circuit 16 determines a normalization factor by normalizing the averaged density data by the maximum value.

For color data stability in this embodiment under the above configuration, as previously mentioned, the marker Y, M, C, and K density data is simultaneously sampled for four pixels continuously starting at the fourth or fifth (fixed) pixel from the leading edge of the marker signal. In this case, a signal of a serial data string of 8 to 9 pixels (=4 to 5 pixels plus 4 pixels) or more is regarded as a marker signal.

Figure 12:
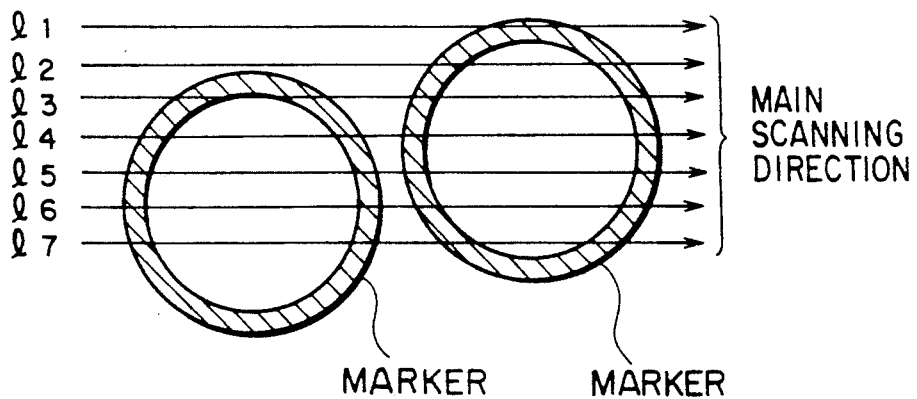
FIG. 12 is an illustration of the scanning state of scanning lines for color conversion.
Figure 13:
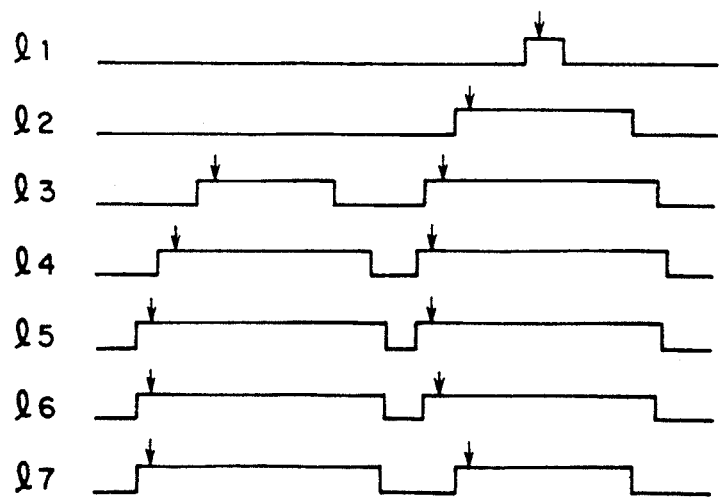
FIG. 13 is a waveform diagram indicating the relationship between marked region signal and sampling point.

FIG. 12 is an illustration of two markers and main scanning lines $l_1$ to $l_7$, and FIG. 13 shows region signals which are obtained by the main scanning lines $l_1$ to $l_7$ and sampling start points. As mentioned above, each sampling start point is located four or five (fixed) pixels behind the leading edge of the corresponding region signal.

The peak sampling part 14 simultaneously samples each 6-bit density data of Y, M, C, and K for a fixed number of pixels (for example, 4 pixels). Since each color density data is simultaneously sampled in this way, the marker color can be correctly read, and the color conversion can also be performed correctly.

The marker color density data which is sampled in this way is averaged by the averaging circuit 15 so as to eliminate variances of the color density data of the four sampled pixels.

Next, the marker color density data which is obtained in this way is normalized. The normalization circuit 16 determines the content ratio of the densities of Y, M, C, and K to the maximum densities of Y, M, C, and K respectively as a normalization factor.

As previously mentioned, the density data in the marked region is processed by the multiplication circuit 18 according to this normalization factor, and the printer unit 21 superimposes toner images corresponding to the image signals in the order of Y, M, C, and K, and then transfers the superimposed image to a transfer paper. The color conversion is performed within the marked region and another region is copied straight to form an image. As mentioned above, the color conversion is performed by detecting the marked region for each scanning line in the main scanning direction, sampling the Y, M, C, and K components of the marker color simultaneously at a predetermined distance from the end of the marker, and multiplying the K density data (black characters) in the marked region by the normalization factor of each color component to convert the data to image data of each color component. By doing this, the full color conversion can be performed correctly and easily.

In the foregoing description, the image processing apparatus of the present invention is applied to a copying machine. Needless to say, however, the image processing apparatus of the present invention can be used for another apparatuses which process various color images.

What is claimed is:

1. An image processing apparatus for recording colors of pixels with a plurality of coloring materials by changing at least a portion of an achromatic image on an original image, which achromatic image has black and white portions and is designated by a marked portion including a color marker having a color, into a chromatic image having a color determined on the basis of the color of the color marker by using the plurality of coloring materials, the apparatus comprising:
    means for reading the original image and separating each pixel of the original image including the marked portions into a plurality of color image components and generating a plurality of color image signals corresponding to the plurality of color image components;
    means for generating color data for each pixel indicating whether each pixel is white, black, or chromatic and generating a plurality of density data for each pixel indicating a density of each of the plurality of coloring materials in the pixel to record a color for each pixel, which color is formed by a combination of the plurality of coloring materials, on the basis of the plurality of color image signal signals;
    means for detecting the marked portion on the basis of the color data; and
    means for changing the color of pixels of the portion of the achromatic image to the color of the color marker of the marked portion on the basis of a plurality of density data for a pixel within the marked portion and by using the plurality of coloring materials.

2. The apparatus of claim 1, further comprising means for sampling at least one of the plurality of density data for each pixel within the marked portion and for selecting a representative pixel representing the marked portion.

3. The apparatus of claim 2, wherein the sampling means includes means for sampling density data from the plurality of density data for each pixel within the marked portion, detecting a peak pixel having a peak level in the sample density data, and selecting the peak pixel as the representative pixel.

4. The apparatus of claim 2, wherein the sampling means includes means for selecting a pixel that is located a predetermined number of pixels inside an edge of the marked portion as the representative pixel.

5. The apparatus of claim 1, wherein the image reading means includes means for reading the original image including the marked portion along a scanning line and the generating means serially outputs a line of color data corresponding to the scanning line.

6. The apparatus of claim 5, wherein the detecting means includes means for determining that a portion of the original image is the marked portion when the detecting means detects more than a predetermined number of successive pixels having color data indicating that the pixels are chromatic.

7. The apparatus of claim 5, further comprising color ghost correction means, having a plurality of color patterns corresponding to color data of a predetermined number of pixels, for receiving a line of color data from the generating means and for correcting the received color data on the basis of the plurality of color patterns.

8. The apparatus of claim 1, wherein the changing means determines a normalization factor for each of the plurality of density data of pixels representing the marked portion based on a predetermined maximum value of each of the plurality of density data.

9. The apparatus of claim 8, wherein the changing means includes means for multiplying density data corresponding to black of pixels of the achromatic image by the normalization factor for each of the plurality of density data of the representative pixel to determine the density of each of the plurality of coloring materials.

10. The apparatus of claim 1, wherein the changing means includes means for changing a color of pixels of at least a portion of an achromatic image located inside a region enclosed by the marked portion to the color of the color marker.

11. The apparatus of claim 1, wherein the changing means includes means for changing a color of pixels of at least a portion of an achromatic image located outside a region enclosed by the marked portion to the color of the color marker.

12. The apparatus of claim 1, wherein the plurality of color image components correspond to red, green, and blue and the plurality of coloring materials includes yellow, magenta, cyan, and black.

13. The apparatus of claim 12, further comprising means for converting one of the plurality of color image signals into density data of one of the plurality of coloring materials.

14. The apparatus of claim 13, wherein the one color image signal corresponds to green and the one coloring material is black.

15. The apparatus of claim 14, further comprising means for transmitting density data of black to the changing means together with other density data generated by the generating means.

16. An image processing apparatus for recording colors of pixels with a plurality of coloring materials by changing at least a portion of an achromatic image on an original image, which achromatic image has black and white portions and is designated by a marked portion including a color marker having a color, into a chromatic image having a color determined on the basis of the color of the color marker by using the plurality of coloring materials, the apparatus comprising:
   means for reading the original image and separating each pixel of the original image including the marked portion into a plurality of color image components and generating a plurality of color image signals corresponding to the plurality of color image components;
   means for generating a plurality of density data for each pixel indicating a density of each of the plurality of color image signals;
   means for detecting the marked portion on the basis of the plurality of color image signals; and
   means for changing the color of pixels of the portions of the achromatic image to the color of the color marker of the marked portion on the basis of a plurality of density data for a pixel within the marked portion and by using the plurality of coloring materials.

17. The apparatus of claim 16, further comprising means for sampling at least one of the plurality of density data for each pixel within the marked portion and for selecting a representative pixel representing the marked portion.

18. The apparatus of claim 17, wherein the sampling means includes means for sampling density data from the plurality of density data for each pixel within the marked portion, detecting a peak pixel having a peak level in the sampled density data, and selecting the peak pixel as the representative pixel.

19. The apparatus of claim 17, wherein the sampling means includes means for selecting a pixel that is located a predetermined number of pixels inside an edge of the marked portion as the representative pixel.

20. The apparatus of claim 16, wherein the changing means includes means for changing a color of pixels of at least a portion of an achromatic image located inside a region enclosed by the marked portion to the color of the color marker.

21. The apparatus of claim 16, wherein the plurality of color image components correspond to red, green, and blue and the plurality of coloring materials includes yellow, magenta, cyan, and black.

* * * * *

UNITED STATES PATENT AND TRADEMARK OFFICE
CERTIFICATE OF CORRECTION

PATENT NO. : 5,216,498
DATED : June 01, 1993
INVENTOR(S) : MASAHIKO MATSUNAWA ET AL.

It is certified that error appears in the above-indentified patent and that said Letters Patent is hereby corrected as shown below:

Item [57],
Abstract, Title Page, line 4, delete, "an"
(second occurrence).

Item [57],
Abstract, Title Page, line 5, after, "components"
insert --,--.

Claim 1, column 12, line 26, change "portions"
to --portion--.

Claim 1, column 12, line 37, delete, "signal".

Signed and Sealed this

Seventeenth Day of May, 1994

Attest:

BRUCE LEHMAN

Attesting Officer          Commissioner of Patents and Trademarks